Jan. 7, 1941.  E. W. GLACY  2,228,006
DRIVING MECHANISM FOR CYCLES
Filed Sept. 24, 1937  3 Sheets-Sheet 1

INVENTOR:
EDWARD W. GLACY,
BY Gales P. Moore
HIS ATTORNEY

Jan. 7, 1941.  E. W. GLACY  2,228,006
DRIVING MECHANISM FOR CYCLES
Filed Sept. 24, 1937  3 Sheets-Sheet 2

INVENTOR:
EDWARD W. GLACY,
BY Gales P. Moore
HIS ATTORNEY.

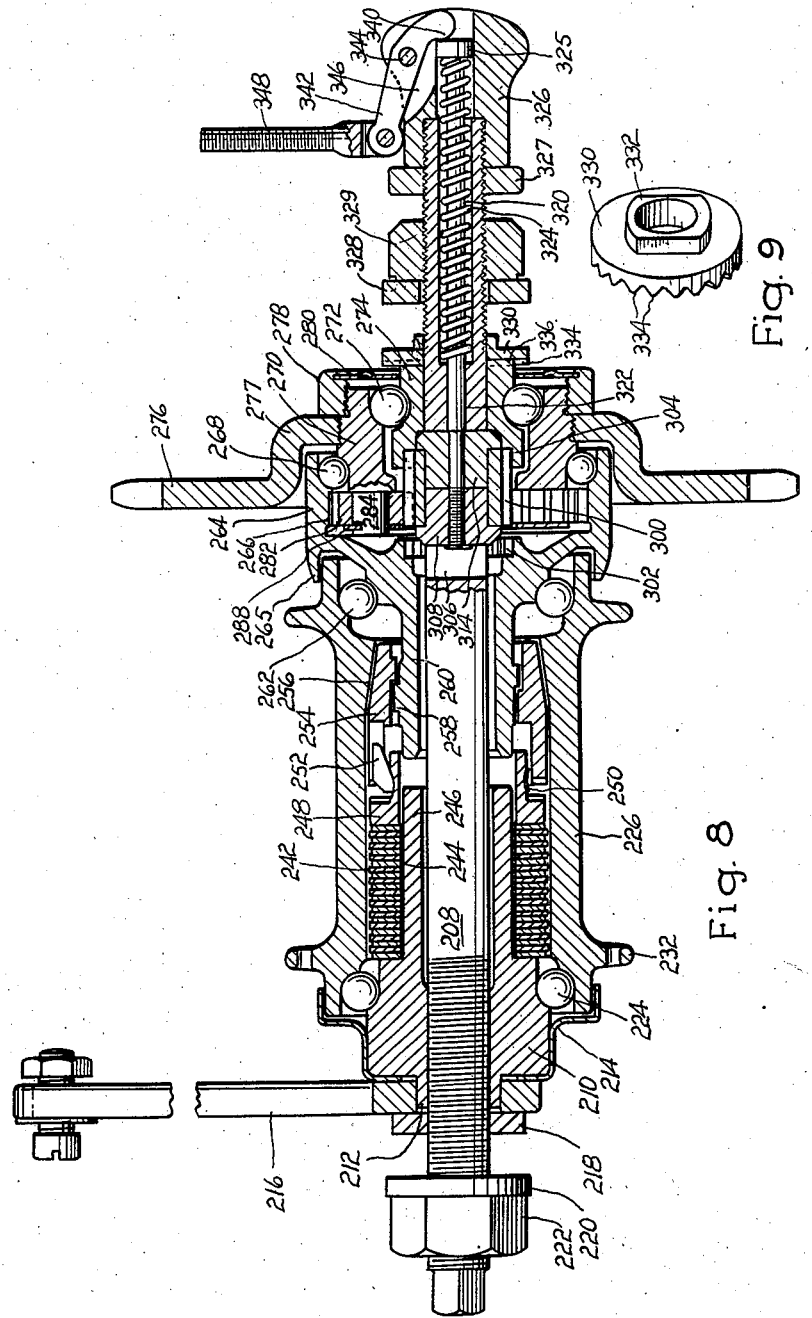

Patented Jan. 7, 1941

2,228,006

UNITED STATES PATENT OFFICE 2,228,006

DRIVING MECHANISM FOR CYCLES

Edward W. Glacy, Bristol, Conn., assignor to General Motors Corporation, Detroit, Mich., a corporation of Delaware Application September 24, 1937, Serial No. 165,473

8 Claims. (Cl. 74—290)

This invention relates to driving mechanism for cycles and comprises all of the features of novelty herein disclosed. An object of the invention is to provide improved multi-speed gearing for cycle hubs. Another object is to provide a simple and inexpensive two-speed gearing which will give a wide range in speeds. Another object is to provide improved means for mounting a multi-speed gearing upon coaster brake hubs. Another object is to provide improved means for holding an axle against rotation with respect to a cycle frame.

To these ends and also to improve generally upon devices of this character, the invention consists in the various matters hereinafter described and claimed. In its broader aspects, the invention is not necessarily limited to the specific constructions selected for illustrative purposes in the accompanying drawings in which Fig. 1 is a central longitudinal sectional view.

Fig. 8 is a view similar to Fig. 1 of a modification.

Fig. 9 is a perspective view of a locking washer.

Figure 1:
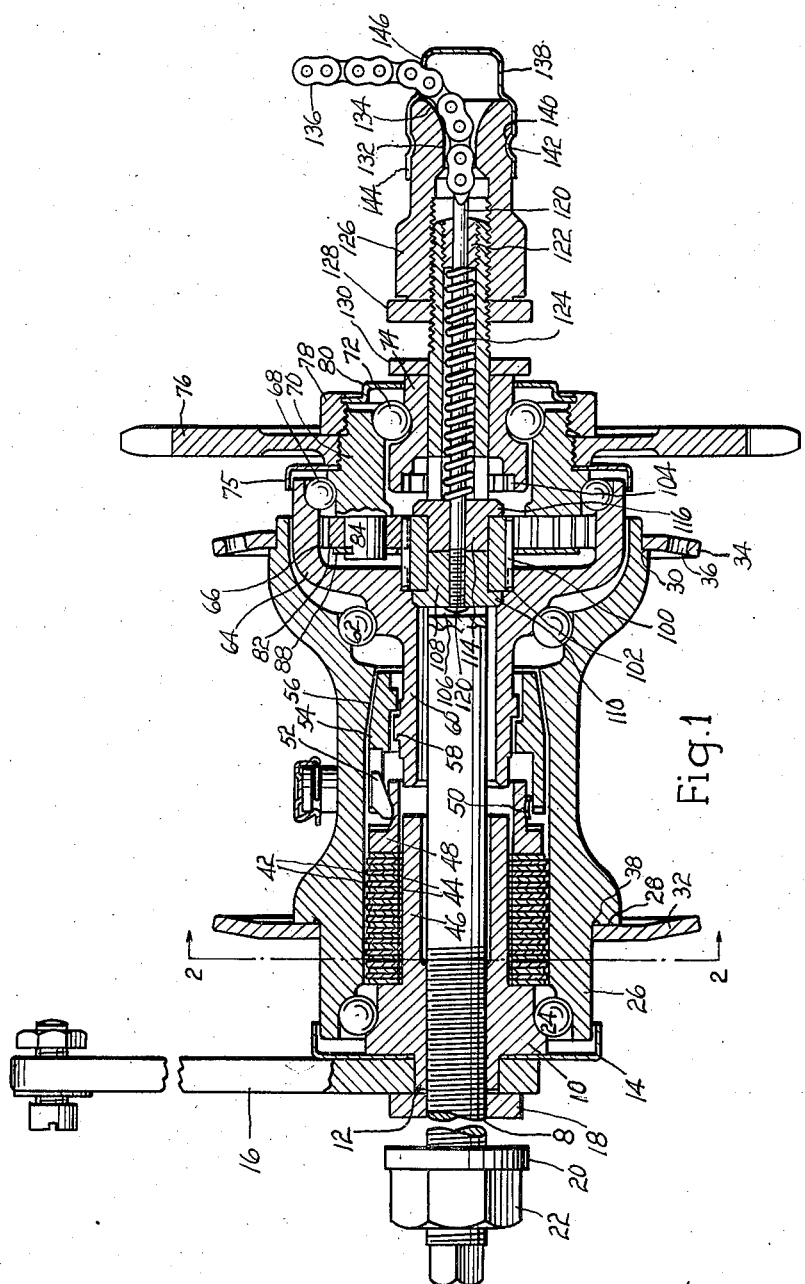
Figure 2:
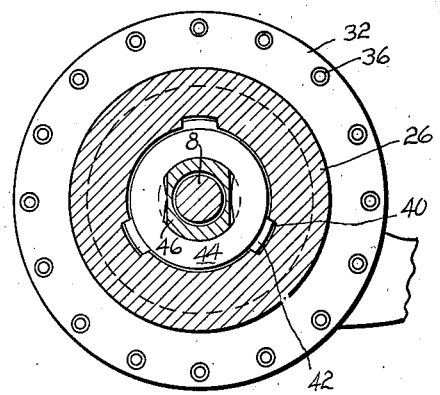
Fig. 2 is a cross sectional view on the line 2—2 of Fig. 1.

The numeral 8 indicates an axle having a threaded portion on which a cone 10 is adjustably fixed. The cone has an anchoring projection 12 entering slots in a dust washer 14 and in an anchoring arm 16 which is secured to the bicycle frame. A nut 18 engages the arm 16 and the usual fork (not shown) is adapted to be clamped against it by a washer 20 and a nut 22. The cone 10 has a thickened portion provided with a raceway for a row of balls 24 which also run in a raceway in a hub 26. The hub has abutment shoulders 28 and 30 near the ends for spoke flanges 32 and 34 respectively, these flanges having their outer portions inclined and provided with chamfered spoke holes 36. At the abutment shoulder 28 is a groove 38 to receive a cooper wire ring used in brazing the spoke flanges to the hub.

The hub is machined from cold drawn steel, carburized and polished. The spoke flanges are blanked from cold rolled strip steel of low carbon content; the spoke holes are pierced and countersunk while the flange is in the flat condition and then the flange is bent to produce the incline. The spoke flanges are furnace copper brazed on the carburized hub with the aid of wire rings one of which is inserted in the grove 38. The hub is then reheated in a hydrogen atmosphere and quenched to harden it, the spoke flanges remaining unhardened and hence not being brittle. By this separate formation of the spoke flanges, the hub can be made of smaller diameter bar stock; the chamfered spoke holes can be punched from flat stock in a power press as distinguished from expensive drilling and countersinking each side of a flange individually as when flanges are turned out of the hub material and integral with it. Also the carburizing process is facilitated because it is not necessary to pack the hub to prevent carbon entering the flanges, the flanges being brazed on after the separate hub is carburized. The flanges are of low carbon steel so that when the assembled hub and flanges are heat treated and quenched, the flanges do not become hard and brittle but remain tough so that the spoke holes will not pull out.

The interior of the hub has three internal keyways 40 to receive lugs on brake discs 42 which alternate with brake discs 44, the latter being held from rotation by flattened surfaces on a brake sleeve 46 which is preferably a part of the cone 10. A brake actuating ring 48 is held from rotation on the sleeve 46 but can be slid axially to squeeze the brake discs together and against a flat face of the cone 10. The ring 48 has a peripheral groove to receive a lag spring or retarder 50 which has a lug 52 entering an axial slot in a nut or shiftable connector 54 which has an exterior tapered clutch surface to engage a clutch surface 56 in the hub. The shiftable connector 54 has teeth at one end adapted to engage teeth on the ring 48, as when the brake is applied.

The connector 54 has steep internal threads engaging external threads 58 on a rotatable controlling member 60 which is provided with a thickened portion having an external raceway for a ball bearing 62 which rotatably supports the hub. The controlling member has an extended portion or enlargement 64 received in an enlargement at the corresponding end of the hub, beyond the bearing 62. The enlargement 64 has internal gear teeth 66 always meshing with a set of planetary pinions as will appear and its end is provided with an internal raceway for a ball bearing 68 which also runs on an external raceway in a carrier ring 70, the carrier ring 70 having an internal raceway for a ball bearing 72 engaging a bearing cone 74 which is secured to the axle 8, as by brazing. A dust shield 75 and a driving sprocket wheel 76 are secured on the carrier ring 70 by a nut 78 which carries a shield 80 covering the bearing 72.

Planetary pinions 82 mesh with the gear teeth 66 and are rotatably mounted on studs or pins 84 projecting from the carrier ring 70, each pin having a notch 86 beyond the gear to cooperate with a gear retaining washer 88. The washer 88 has a number of openings, each formed with a surface 90 concentric with the washer axis and adapted to engage the bottom of the notch 86, a rounded surface 92 adapted to conform to a portion of the pin 84, an enlarged area 94 which will admit the pin, and a locking lug 96. Each lug extends at right angles to the plane of the washer when the washer is put over the pins 84 and the lugs are bent back into the plane of the washer after the latter is turned to bring the surfaces 90 into the slots 86.

A wide sun gear 100 meshing with the planetary pinions 82 is adapted to rotate around the axle 8 and is capable of slidable movement thereon to engage either the internal clutch teeth 102 on the controlling member 60 or to engage internal clutch teeth 104 in the end of the anchored cone 74. The ends of the sun gear teeth are bevelled to facilitate engagement. The axle is slotted diametrically at 106 to receive a flat plate 108 having projecting lugs 110 overlapping one end of the sun gear to shift the latter in one direction, the member 60 having a recess to clear the lugs. A similar flat plate 114 in the axle slot has lugs 116 at the other end of the shiftable sun gear, and the cone 74 has a recess to clear the lugs when the sun gear is shifted to its locked position. The plates 108 and 114 meet one another inside the sun gear but allow the latter to turn around the axle between the lugs. A shifter rod 120 which is threaded in the plate 108 passes through the plate 114 and through a guiding plug 122 threaded in the hollow outer end of the axle. A coil spring 124 is interposed between the plug 122 and the plate 114 to urge the sun gear to the low speed position indicated, the rod 120 serving to pull the gear towards the high speed position.

A nut 126 is threaded on the axle against a washer 128 between which and a companion washer 130 the other fork of the bicycle is clamped. The nut has an opening 132 whose wall merges with a rounded surface 134 to guide a chain 136 which is secured to the flattened end of the rod 120 and is controlled by the rider at any convenient location on the bicycle frame. A guard 138 is adapted to snap over the nut, the nut having a groove 140 to receive an internal rib 142 on the guard. The guard is made springy by an axial slot 144 leading into a rounded opening 146 through which the chain passes.

In the indicated position, which is the low speed position, power applied to the sprocket wheel 76 turns the carrier ring 70 and the planetary gears, such gears being then locked against rotation around their pins by the internal gear 66 and the sun gear 100, the latter then being clutched to the controlling member 60 which carries the internal gear. All of said parts turn as a unit around the axle including the thread 58 which causes the nut 54 to shift into driving relation to the hub. Upon shifting the sun gear into clutched engagement with the anchored cone, the planetary pinions are compelled to turn on their axes as they roll around the anchored sun gear. This compels the member 60 and the hub to turn at a considerably greater speed. Upon arresting the forward rotation of the sprocket at either speed, the hub overruns or coasts, the nut 54 becoming released from the hub. Upon turning the sprocket backwardly at either speed, the nut 54 is positively shifted endwise to the left by the thread 58 and squeezes the brake discs together to apply the brake. In the illustrated construction the high speed is 38% greater than the low speed, a considerably greater increase of speed ratio than has hitherto been obtained without the complication or expense of a three-speed gear. This is due to the overdrive wherein the member 60, which controls the driving and braking, carries the enlargement 64 with the internal gear teeth 66. The hub is enlarged at one end only, the remaining portion being no larger than the usual coaster brake hub and having the desirable large braking capacity afforded by the multiple disc brake. This two speed coaster brake hub is interchangeable with any present make of coaster brake hub without distortion of the frame forks.

Assembly of the parts is easy. The brake parts are assembled within the hub from the brake end, beginning with the nut 54 and followed by the lag spring 50, brake actuating ring 48, brake discs, and cone 10. The control member 60 screws into the nut 54 from the other end of the hub. The member 60, the axle and remaining parts constitute a sub-assembly. The sun gear is slid over the left end of the axle towards the brazed-on cone 74. The plates 108 and 114 are successively inserted in the axle slot and passed into the sun gear from the ends. The coil spring and guide plug 120 are put into the axle from the end, followed by the shifter rod 120. The bearing 68 is placed on the carrier ring 70 before the planet pinions 82 are put on their pins and locked by the washer 88. With or without the few remaining parts which can be put on later, the assembled axle and gears, etc., are put into the hub from the large end, the axle being turned to screw it through the cone 10 for adjustment of the bearings. The other cone 74, being brazed to the axle, cannot change its relation to the gears. The assembled structure is then ready for attachment to any standard bicycle frame.

Figure 6:
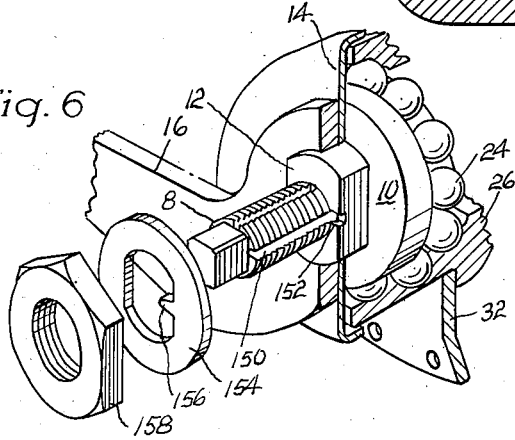
Fig. 6 is a perspective view of an axle securing means with parts broken away and in section.

In Fig. 6, there is shown a modified means for securing the anchor arm 16 and the axle 8 to the cone 10. The axle has a plurality of longitudinal slots 150 one of which is placed in alignment with a slot 152 in the flattened projection 12 of the cone. A washer 154 is internally shaped to fit the flats on the projection 12 and has a lug 156 projecting into the slots 152 and 150, thus keying the cone to the axle after the latter is adjusted. A lock nut 158 engages the washer 154 and clamps the anchor arm 16. The fork of the bicycle frame straddles the axle outside of the nut 158 and is secured by a washer and nut as in Fig. 1.

Figure 7:
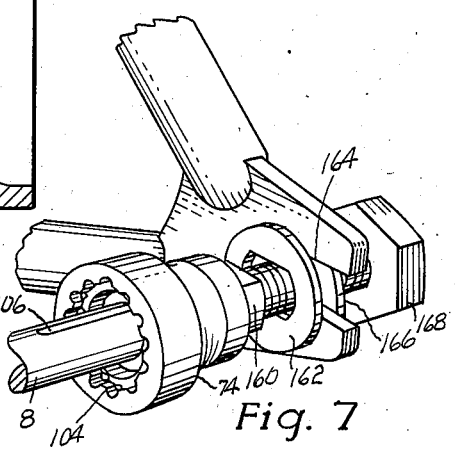
Fig. 7 is a perspective view of another form of axle securing means.

Fig. 7 shows a modified means for securing the frame to the right hand cone 74. A flattened projection 160 on the cone projects through a similarly shaped opening in a washer 162 and fits the fork 164 of the frame. A washer 166 and a nut 168 similar to those shown in Fig. 1 are then set up against the outer face of the fork. Since the cone 74 is securely brazed to the axle, the axle cannot turn when assembled in the frame. The securing means of Fig. 7 can be used with that of Fig. 6 but ordinarily one securing means would be sufficient.

In Fig. 8, reference numerals 208 to 258 inclusive indicate parts which are identical with or correspond to the parts indicated by numerals 8 to 58 inclusive in Fig. 1. All such numbered parts in Fig. 8 are standard parts in a well known commercial coaster brake. The controlling member 260 comprises a sleeve which is extended outwardly or enlarged beyond the end of the hub 226 where it is provided with a flange or axial extension 264 having internal gear teeth 266. Another and oppositely extended axial projection or flange 265 overlaps the end of the hub to form a dust guard. The sleeve has an external raceway for a bearing 262 and an internal raceway for a bearing 268 interposed between the flange 264 and a driven ring or carrier 270 which is journalled on a ball bearing 272 having a cone 274 brazed to the axle 208. A sprocket wheel 276 or other power member surrounds the extension 264 to shield the bearing 268, its hub portion 277 being offset or dished and threaded on the carrier 270 where it is secured by a nut 278 having a shield 289 surrounding the cone 274.

Figure 3:
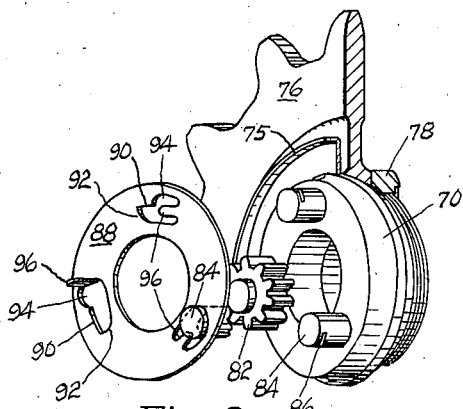
Fig. 3 is a perspective view of separated portions of the pinion holding means.
Figure 4:
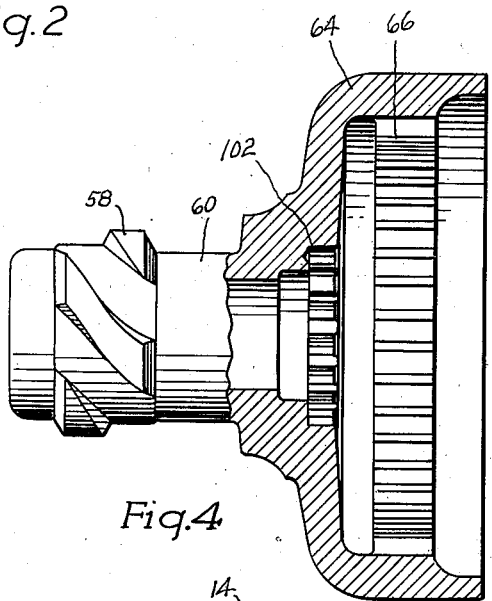
Fig. 4 is an elevation, partly in axial section, of a controlling member.
Figure 5:
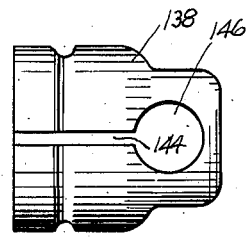
Fig. 5 is a plan view of a guard.

Planetary pinions 282 are journalled on studs or pins 284 of the carrier 270 and are retained by a washer 288 as in Figs. 1 and 3. A wide sun gear 300 is mounted to interlock either with internal clutch teeth 302 on the controlling member 260 or with internal clutch teeth 304 on the cone 274. The axle 208 has a diametrical slot 306 to receive plates 308 and 314 which are actuated by a shifter rod 320. This rod is threaded in plate 308 and has a shoulder abutting against the plate 314, the rod being guided in a hole 322 of the axle. Beyond the hole, the axle is counterbored to receive a coil spring 324 which reacts against a head 325 on the outer end of the shifter rod and so tends to shift the sun gear 300 to the high speed position indicated.

The head 325 is guided in a hole in a cap or nut 326 which is threaded on the end of the axle and locked by a nut 327, these nuts being beyond the fork-engaging washer 328 and its clamping nut 329. In order to secure the axle against turning in the frame fork, as when driving or braking with the parts in high gear as shown in Fig. 8, the usual slot in the fork embraces a flattened extension 332 on a washer 330 which is clamped against the cone 274, the washer 330 having a plurality of radial ribs 334 to interlock with similar radial ribs 336 on the anchored cone 274. In order to shift the sun gear 300 at will to the low speed position where it interlocks with the clutch teeth 302, the head 325 of the shifter rod is engaged by a rounded arm 340 on a lever 342 which is pivoted at 344 in a slot 346 of the nut 326, the lever being pivoted to a member 348 which is adjustably connected to any suitable actuating devices on the frame.

The hub 226 and all parts to the left of the bearing 262 except the axle are standard parts of a well known commercial coaster brake hub having one speed. To convert that one-speed hub into a two-speed hub, the old axle and the usual sprocket-carrying controlling member and its supporting cone are discarded and replaced by the new axle 208, the new controlling member 260 and all parts to the right of the bearing 262, this structure constituting a conversion unit or sub-assembly. It is shipped in assembled condition ready for use and is simply slipped into the coaster hub from one end, the controlling member 260 being screwed into the connector 254 and the axle being screwed into the anchored cone 210. The axle is then secured in the frame forks.

I claim:

1. In a device of the character described, a cycle hub, a rotatable controlling member projecting within the hub to control driving, the controlling member having an axial extension having an annular flange overlying and extending beyond the end of the hub, the flange having an internal gear, a rotatably driven carrier projecting into said extension and having planetary pinions engaging the gear, a bearing between the exterior of the controlling member and the hub, a bearing between the interior of the axial extension and the exterior of the carrier, and means for selectively causing the pinions to rotate on their axes to drive the gear or to become locked to the controlling member for rotation therewith; substantially as described.

2. In a device of the character described, a cycle hub having a coaster brake, an axle, a rotatable controlling member projecting within the hub to selectively control driving and braking, an enlarged flange on the controlling member projecting out of one end of the hub and having an internal gear located outside of said hub, a rearwardly directed portion of said flange overlying an end of the hub, a rotatably driven carrier outside of the hub and having studs projecting within the gear, planetary pinions on the studs, a shiftable gear engaging the pinions, and means for selectively locking the shiftable gear to the controlling member or to the axle; substantially as described.

3. In a device of the character described, a cycle hub having a coaster brake, an axle, a rotatable controlling member journalled on said hub and projecting within the hub to control driving and braking, an enlarged end on the controlling member overlying one end of the hub and having an internal gear located outside of said hub, a rotatably driven carrier journalled within the enlarged portion and located beyond said hub end and having planetary pinions engaging the gear, a shiftable gear engaging the pinions, a set of clutch teeth on the controlling member and a set of clutch teeth fixed with respect to the axle, and means for moving the shiftable gear to selectively interlock it with either set of clutch teeth; substantially as described.

4. In a device of the character described, a cycle hub having a coaster brake, a rotatable controlling member projecting within the hub to control driving and braking, the controlling member being enlarged at one end of the hub and having an internal gear, a rotatably driven carrier beyond the hub and having planetary pinions engaging the gear, an antifriction bearing within the outer end of said enlarged portion and supporting said carrier, a sprocket secured to the carrier and having a dished portion which overlies the enlarged portion of the controlling member, and which protects said bearing and means for selectively causing the pinions to rotate with respect to the carrier or to rotate bodily with the carrier and the controlling member; substantially as described.

5. In a device of the character described, a driven carrier having a plurality of pins projecting axially thereof, planetary pinions journalled on the pins, a washer engaging the pinions and interlocking with the pins, and means on the washer engaging one of said pins and preventing said washer from moving out of said interlocked relation; substantially as described.

6. In a device of the character described, a driven carrier having a plurality of pins projecting axially thereof, planetary pinions journalled on the pins, the pins having transverse notches, a washer having openings for the pins and adjacent portions to enter the notches, and means for locking the washer against turning with respect to the carrier; substantially as described.

7. In a device of the character described, a driven carrier having a plurality of pins projecting axially thereof, planetary pinions journalled in the pins, the pins having transverse notches beyond the pinions, a washer having openings for the pins with adjacent edges adapted to turn into the notches, and the washer having bendable lugs to engage the pins; substantially as described.

8. In a device of the character described, a driving and braking control member comprising a sleeve with an external thread, the sleeve having an enlargement at one end with oppositely extending axial flanges, and the outermost flange having an internal gear; substantially as described.

EDWARD W. GLACY.